United States Patent Office 3,344,114
Patented Sept. 26, 1967

3,344,114
POLYMERS OF ARYL EPOXY ETHERS
Thomas B. Gibb, Jr., Murray Hill, and Robert A. Clendinning, New Providence, N.J., assignors to Union Carbide Corporation, a corporation of New York
No Drawing. Filed Oct. 16, 1963, Ser. No. 316,533
18 Claims. (Cl. 260—47)

ABSTRACT OF THE DISCLOSURE

This invention relates to a thermoplastic polymer characterized by a melting point in excess of about 215° C. and a reduced viscosity of at least about 0.5, consisting essentially of repeating units of the formula:

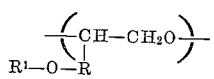

where R is a divalent saturated aliphatic hydrocarbon radical and $R^1$ is an aryl hydrocarbon radical having at least two aromatic hydrocarbon rings and having 10 to 24 carbon atoms inclusive.

---

This invention relates to polymers of aryl epoxy ethers. More specifically, this invention relates to thermoplastic polymers of aryl epoxy ethers which have relatively high melting points and excellent chemical resistance and which find wide utility in the manufacture of textile fibers, self-sustaining film which is useful in packaging household articles, and gaskets which are employed in chemical processing equipment.

The preparation of solid polymers from such monomers as phenylglycidylether, p-chlorophenylglycidylether and p-methylphenylglycidylether has resulted in polymers which are characterized by melting points not in excess of about 215° C. Although these polymers can be readily shaped into useful articles, their relatively low melting points preclude the wide use of such polymers as textile fibers, and in other similar type applications wherein relatively high melting points are a prerequisite.

The present invention provides for thermoplastc polymers of aryl epoxy ethers having relatively high melting points, substantially in excess of 215° C., excellent chemical resistivity and are characterized, generally, by reduced viscosities of at least about 0.5.

The aryl epoxy ethers of this invention polymerize through their epoxy group to form polymers which contain the repeating unit:

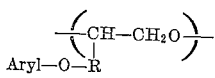

wherein R is a divalent saturated aliphatic hydrocarbon radical. Particularly desirable polymers are those having the repeating unit, as indicated above, wherein R contains a maximum of 4 carbon atoms.

Among aryl epoxy ethers and mixtures thereof which can be polymerized to produce the polymers of this invention are those which can be represented by the formula:

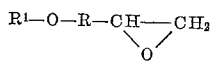

wherein R is as previously defined and $R^1$ is an aryl hydrocarbon radical containing at least two aromatic rings and having at least 10 carbon atoms, generally 10 to 24 carbon atoms inclusive and preferably 10 to 16 carbon atoms inclusive.

Illustrative radicals for R are the following: methylene, ethylene, trimethylene, tetramethylene and the like.

Exemplary of suitable radicals for $R^1$ are the following carbocyclic aryl radicals:

phenylphenyl

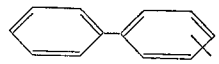

naphthyl

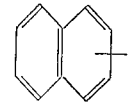

anthracenyl

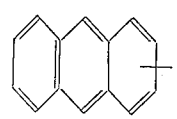

phenanthryl

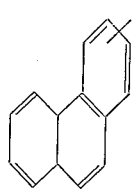

phenyl alpha-naphthyl

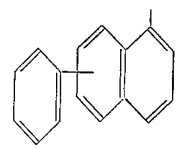

phenyl beta-naphthyl

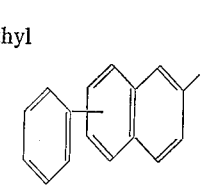

pyryl

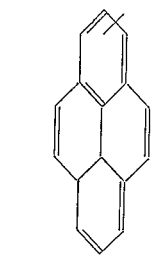

perylyl

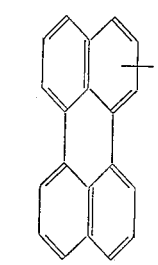

coronyl

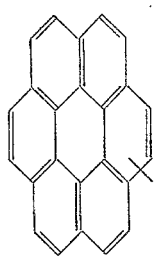

It is to be understood that the aryl or aromatic radicals, which can be fused or non-fused as indicated by the representative radicals listed, can contain substituents such as alkyl groups, generally containing 1 to 8 carbon atoms inclusive and preferably containing 1 to 6 carbon atoms inclusive; halogen atoms, e.g., chlorine, bromine and the like; cyano groups; alkoxy groups, generally containing 1 to 8 carbon atoms inclusive and preferably containing 1 to 6 carbon atoms inclusive; nitro groups and the like.

The procedure used to determine the reduced viscosity values noted in this application was as follows: a 0.05 gram sample of polymer was weighed into a 25 ml. volumetric flask which contained a mixture of p-chlorophenol and pinene, with the pinene being present in an amount of about 2 percent by weight. The flask was heated for 60 minutes in an oil bath which was maintained at 215° C. after solution of the polymer was complete, additional p-chlorophenol mixture was added to produce a 25 ml. solution while the flask was maintained in a constant temperature bath which was at a temperature of 47° C. The solution was thereafter filtered through a sintered glass funnel and the viscosity of a 3 ml. sample determined in a Cannon viscometer at a temperature of about 47° C.

Reduced viscosity was computed by use of the equation:

$$RV = \frac{t_s - t_o}{ct_o}$$

wherein $t_o$ is the efflux time for the solvent, $t_s$ is the efflux time for the polymer solution, $c$ is the concentration of the solution in terms of grams of polymer per 100 ml. of solution.

The polymerization of the monomers is conducted by charging a desired monomer or mixture of monomers into a reaction flask containing an organometallic catalyst and a controlled amount of water. The organometallics which can be employed as catalysts for the polymerization of the monomers are those compounds having the formula:

$$R_1—Me—R_2$$

wherein Me is a metal of Group II of the Periodic Table, i.e., beryllium, magnesium, calcium, zinc, strontium, cadmium, barium, mercury and radium; and wherein $R_1$ and $R_2$ are monovalent hydrocarbon radicals, such as alkyl, aralkyl, alkaryl and cycloalkyl and the like. Particularly desirable organometallics are those compounds having the structure noted above, wherein $R_1$ and $R_2$ are hydrocarbon radicals containing a maximum of 10 carbon atoms and being free of olefinic and acetylenic unsaturation. Representative radicals for $R_1$ and $R_2$ include, among others, alkyl radicals such as methyl, ethyl, n-propyl, isopropyl, n-butyl, isobutyl, 2-ethylhexyl, dodecyl, octadecyl and the like; aromatic radicals, such as phenyl, tolyl, xylyl, benzyl, phenethyl, phenylpropyl, phenylbutyl and the like; cycloaliphatic radicals, such as cyclopentyl, cyclohexyl, cycloheptyl, 3-propylcyclohexyl and the like; unsaturated aliphatic radicals, such as allyl and the like.

Illustrative of organometallic compounds which can be used as catalysts are diethylzinc, dipropylzinc, di-n-butylzinc, dioctadecylzinc, dicyclohexylzinc, diphenylzinc, di-o-tolylzinc, diethylmagnesium, di-n-butylmagnesium, dioctylmagnesium, diphenylmagnesium, diethylberyllium, di-n-butylberyllium, diethylcadmium, dipropylcadmium, diisoamylcadmium, diphenylcadmium and the like.

The organometallics are known compounds and can be prepared according to the methods described in Berichte 63, 1138 (1934); 59, 931 (1926).

The amount of organometallic used can vary from about 0.01 to about 12 percent by weight, based on the weight of the monomer charged. More than about 12 percent by weight can be used, but this is economically undesirable and effects no substantial increase in the amount of product which is produced. It is preferred to use about 0.1 to about 3 percent by weight organometallic based on the weight of the monomer charged.

The water which is employed in conjunction with the organometallic serves as a promoter for the polymerization reaction. As a rule, water is employed in an amount of from about 0.01 to about 1.3 moles per mole of the organometallic compound. Optimum results are achieved using about 0.75 to about 1 mole of water per mole of organometallic compound. The water may be admixed with the organometallic compound and the resultant product fed into the reaction vessel or the monomer may be admixed with either the organometallic or water in any desired sequence.

The temperature at which the polymerization reaction is conducted can be varied over a wide temperature range, from about 0° C. to about 200° C., and, if desired, even higher. A temperature in the range of about 60° C. to about 175° C. is most preferred. It is also preferred to conduct the polymerization reaction in the presence of an organic diluent which is non-reactive with respect to the monomer, catalyst and polymer and is a solvent for the monomer-catalyst mixture. During the polymerization reaction, particularly whenever more than about 50 percent by weight of the monomer is converted to the polymer, the reaction mixture becomes high viscous. If a diluent is not present, it is difficult to remove the heat of reaction which, if not removed, might cause undesirable side reactions to occur. In addition, the use of a diluent facilitates removal of unreacted monomer from the polymer.

Illustrative of suitable organic diluents are the aromatic hydrocarbons such as benzene, toluene and the like, as well as halogenated derivatives thereof; cycloaliphatics, such as cyclopentane, cyclohexane, isopropylcyclohexane and the like; alkoxy compounds, such as methoxy benzene and the like; the dimethyl and diethyl ethers of ethylene glycol, propylene glycol, diethylene glycol and the like.

The diluent can be added prior to the commencement of the polymerization reaction or during the polymerization reaction in amounts of about 5 to about 90 parts by weight per 100 parts by weight monomer and diluent.

The polymerization reaction is preferably conducted under an inert atmosphere, for example, nitrogen, and under atmospheric, superatmospheric or subatmospheric pressures. The time required to polymerize an aryl epoxy ether, as described, to a solid polymer will vary and depend upon a number of factors, such as the temperature at which the polymerization reaction is being conducted, the amount and nature of the organometallic catalyst used and also upon the nature of the monomer employed. The percent weight conversion of monomer to polymer, as noted in this application, was determined by removing the unreacted monomer and catalyst residue from the polymer, drying the polymer to constant weight at a temperature of from about 50° C. to about 60° C. under a pressure of 25 mm. of Hg., weighing the polymer, dividing the weight of the polymer by the weight of the monomer charged and multiplying by 100.

The monomers which are polymerized to produce the polymers of this invention can be conveniently prepared by epoxidizing the desired aryl hydroxy compound in a manner as described in U.S. patent to Farnham et al., 2,943,095, issued June 28, 1960, and also as described in the examples of this application.

The following examples further illustrate the present invention and are not intended to limit the scope thereof in any manner.

EXAMPLE 1

This example illustrates the preparation of a solid polymer from α-naphthyl glycidyl ether.

(a) Preparation of α-naphthyl glycidyl ether

Two hundred and eighty-eight grams (2 moles) of α-naphthol, 925 grams (10 moles) of epichlorohydrin and 336 grams of ethanol were charged into a three-necked, three liter flask which was equipped with a stirrer, condenser, thermometer, dropping funnel and a nitrogen inlet. The reaction mixture was heated to a temperature of about 55° C. to about 60° C. while nitrogen gas was slowly passed into the flask. Increments of aqueous sodium hydroxide solution (103.1 grams of sodium hydroxide in 100 grams of water) were then introduced into the flask according to the following schedule:

Grams of sodium hydroxide
solution added:                  Time
5.7 _____ 15 minutes after the solution reached
             a temperature of about 55° C.
11.4 _____ 15 minutes after the first addition.
22.8 _____ 15 minutes after the second addition.
45.6 _____ 15 minutes after the third addition.
67.5 _____ 5 minutes after the fourth addition.

During the addition of the sodium hydroxide solution, the reaction mixture was maintained at a temperature of about 55° C. Once the addition of the sodium hydroxide solution had been completed, the reaction mixture was stirred for 25 minutes and the salt which precipitated during the reaction was allowed to settle. The organic layer which formed in the reaction flask was decanted into a second three-liter flask and to the organic layer there was then added 18 grams of a 50 percent aqueous solution of sodium hydroxide. The resultant mixture was heated at a temperature of about 55° C. for 5 minutes. The reaction mixture was then transferred to a separatory funnel wherein the aqueous layer was separated from the organic layer. The organic layer was then poured back into the three-liter flask. Volatiles were removed from the organic layer by a distillation operation under a pressure of about 42 mm. of Hg to a pot temperature of about 110° C. The crude product which was recovered was distilled through a 12-inch vacuum jacketed Vigreux column under a pressure of about 0.17 mm. of Hg. The α-naphthyl glycidyl ether recovered had a calculated epoxy assay of 205 and a hydrolyzable chlorine content of >0.02 percent.

(b) Polymerization of α-naphthyl glycidyl ether to a solid polymer

A number of reaction mixtures were prepared utilizing α-naphthyl glycidyl ether, water and dibutylzinc. Each mixture was placed into a tube and sealed therein under a nitrogen gas atmosphere. Each tube was then heated at a temperature and for a period of time indicated below. In each instance, the contents of each tube were as follows: 14.4 grams of α-naphthyl glycidyl ether, 0.027 ml. of distilled water, 17.5 ml. of toluene and a 2 ml. solution of dibutylzinc in toluene containing 0.5 percent by weight dibutylzinc. After being heated under conditions noted below, each tube was broken open and its contents transferred to a Waring Blendor using 200 ml. of a mixture (50–50 on a volume basis) of acetone and toluene. After thorough agitation in the Waring Blendor, the mixture was poured into 2 liters of ethyl alcohol. The polymer, recovered as a filter cake, was dried to constant weight and its reduced viscosity and melting point determined.

| Tubes | Mole Ratio of H$_2$O and Dibutylzinc | Hours at 90° C. | Percent Conversion | Reduced Viscosity | Melting Point, ° C. |
|---|---|---|---|---|---|
| 1 | 0.9–1 | 24 | 95 | 4.3 | 235 |
| 2 | 0.9–1 | 48 | 99 | 3.9 | 235 |
| 3 | 0.9–1 | 48 | 97 | 6.0 | 235 |
| 4 | 0.9–1 | 48 | 96 | 5.6 | 235 |

EXAMPLE 2

This example illustrates the preparation of a solid polymer from α-naphthyl glycidyl ether.

(a) Preparation of β-naphthyl glycidyl ether

One hundred forty-four and two tenths grams (1 mole) of α-naphthol and 281 grams (3 moles) of epichlorohydrin were charged into a three-necked, three-liter flask which was equipped with a stirrer, condenser, thermometer, dropping funnel and a nitrogen inlet. The reaction mixture was warmed to a temperature of about 40° C. and 44 grams of an aqueous solution of sodium hydroxide, 1.1 moles of sodium hydroxide in 50 ml. of water, added thereto. The rate of addition of the sodium hydroxide solution was adjusted so that the temperature of the reaction mixture was kept at about 60° C. The time required for the sodium hydroxide addition was 1.6 hours. The reaction mixture was allowed to stand overnight at room temperature, about 23° C., and thereafter water and epichlorohydrin removed therefrom by distillation under a pressure of 30 mm. of Hg to a pot temperature of about 65° C. The organic phase was heated, with 75 ml. of chloroform and 150 ml. of water, to a temperature of about 65° C. The mixture was then allowed to cool to about room temperature and the aqueous layer removed from the flask. The chloroform layer which remained in the flask was washed four times with 50 ml. portions of water and then dried over magnesium sulfate. The chloroform was removed by distillation under atmospheric pressure. The product, which remained in the flask, was then flashed distilled at a temperature of about 162° C. to about 193° C. under a pressure of about 0.175 mm. to about 0.20 mm. of Hg. The distillate, which was recovered, solidified to white crystals having a melting point of 59° C. to 62° C. The product, β-naphthyl glycidyl ether, recovered in the form of white crystals, had an epoxy assay of 201.

(b) Preparation of a solid polymer from β-naphthyl glycidyl ether

Into a three-necked, 250 ml. flask which was equipped with a stirrer, condenser, thermometer and nitrogen inlet, there was placed 58.4 grams of β-naphthyl glycidyl ether, 100 ml. of toluene, 0.070 ml. of distilled water and 5.61 grams of a solution of dibutylzinc in toluene (0.156 gram of dibutylzinc per ml. of toluene). The reaction mixture was heated for 5 hours at a temperature of 100° C. with stirring and with nitrogen gas being passed over its surface. After the 5-hour period, the contents of the flask were transferred into a Waring Blendor using a mixture (50–50 on a volume basis) of acetone and toluene. After thorough agitation in the Waring Blendor, the mixture was poured to 2 liters of ethyl alcohol. The polymer, recovered as a filter cake, was dried to constant weight and its reduced viscosity and melting point determined.

Reduced viscosity _____ 3.5
Melting point, ° C. _____ 297

Example 3

In a manner described in Example 2, various other aryl glycidyl ethers were polymerized using the same catalyst system and same relative amounts of reactants.

Melting points of the polymers are set forth in the table which follows:

| Monomer polymerized: | Melting point, °C. |
|---|---|
| p-Phenylphenyl glycidyl ether | 293 |
| 9-anthracenyl glycidyl ether | >300 |
| 2-phenanthryl glycidyl ether | >300 |
| 6-phenyl α-naphthyl glycidyl ether | >300 |
| Coronyl glycidyl ether | >300 |
| Mixture of p-phenylphenyl glycidyl ether and β-naphthyl glycidyl ether | 285 |

In order to demonstrate the excellent chemical resistivity possessed by the polymers of this invention, samples of poly(β-naphthyl glycidyl ether) and poly(phenyl glycidyl ether), each having a reduced viscosity of 3.9, were placed in various organic liquids and the temperature at which the polymer went into solution noted. In each instance the initial mixture was made up of 0.2 gram of polymer per 100 ml. of organic liquid. The results of each test are tabulated below.

ORGANIC LIQUID

| Polymer | p-Chlorophenol | Tetrachloroethane | Dimethyl formamide |
|---|---|---|---|
| Poly(β-naphthyl glycidyl ether) | Insoluble at 200° C | Insoluble | Insoluble. |
| Poly(phenyl glycidyl ether) | Soluble at 140° C | Soluble at 140° C | Soluble at 140° C. |

What is claimed is:
1. A thermoplastic polymer, characterized by a melting point in excess of about 215° C. and a reduced viscosity of at least about 0.5, consisting essentially of repeating units of the formula:

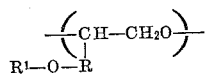

where R is a divalent saturated aliphatic hydrocarbon radical and $R^1$ is an aryl hydrocarbon radical having at least two aromatic hydrocarbon rings and having 10 to 24 carbon atoms inclusive.

2. A polymer as defined in claim 1 wherein R contains a maximum of 4 carbon atoms.
3. A polymer as defined in claim 1 wherein $R^1$ has 10 to 16 carbon atoms inclusive.
4. A polymer as defined in claim 1 wherein R contains a maximum of 4 carbon atoms and $R^1$ contains 10 to 16 carbon atoms inclusive.
5. A polymer as defined in claim 1 wherein $R^1$ is p-phenylphenyl.
6. A polymer as defined in claim 1 wherein $R^1$ is α-naphthyl.
7. A polymer as defined in claim 1 wherein $R^1$ is β-napthyl.
8. A polymer as defined in claim 1 wherein $R^1$ is 9-anthracenyl.
9. A polymer as defined in claim 1 wherein $R^1$ is 2-phenanthryl.
10. A polymer as defined in claim 1 wherein $R^1$ is 6-phenyl α-naphthyl.
11. A polymer as defined in claim 1 wherein $R^1$ is coronyl.
12. A polymer as defined in claim 1 wherein $R^1$ is p-phenylphenyl and R is methylene.
13. A polymer as defined in claim 1 wherein $R^1$ is α-naphthyl and R is methylene.
14. A polymer as defined in claim 1 wherein $R^1$ is β-naphthyl and R is methylene.
15. A polymer as defined in claim 1 wherein $R^1$ is 9-anthracenyl and R is methylene.
16. A polymer as defined in claim 1 wherein $R^1$ is 2-phenanthryl and R is methylene.
17. A polymer as defined in claim 1 wherein $R^1$ is 6-phenyl α-naphthyl and R is methylene.
18. A polymer as defined in claim 1 wherein $R^1$ is coronyl and R is methylene.

References Cited

UNITED STATES PATENTS 2,181,085  11/1939  Alquist et al. _____ 260—47

OTHER REFERENCES

Furukawa et al.; Die Makromolekulare Chemie., vol. 32, pp. 90–94, July 1959.

SAMUEL H. BLECH, Primary Examiner.

WILLIAM H. SHORT, Examiner.

T. D. KERWIN, Assistant Examiner.